(12) United States Patent
Gilpin

(10) Patent No.: US 6,591,443 B1
(45) Date of Patent: Jul. 15, 2003

(54) HEATED WINDSHIELD WIPER

(76) Inventor: Nick Gilpin, 12 Club Ct., Columbia, MO (US) 65201-6332

( * ) Notice: Subject to any disclaimer, the term of this patent is extended or adjusted under 35 U.S.C. 154(b) by 0 days.

(21) Appl. No.: 10/045,528

(22) Filed: Jan. 15, 2002

(51) Int. Cl.$^7$ ................................................. B60S 1/38
(52) U.S. Cl. .............................. 15/250.06; 15/250.07; 219/202
(58) Field of Search .................... 15/250.05, 250.06, 15/250.07, 250.08, 250.09; 219/202, 203

(56) References Cited

U.S. PATENT DOCUMENTS

| | | | |
|---|---|---|---|
| 3,428,993 A | * 2/1969 | Rickett | 15/250.06 |
| 3,639,938 A | * 2/1972 | Golden | 15/250.06 |
| 4,152,808 A | * 5/1979 | Andregg | 15/250.07 |
| 4,194,261 A | * 3/1980 | Parkinson | 15/250.07 |
| 4,360,941 A | * 11/1982 | Mabie | 15/250.06 |
| 4,387,290 A | * 6/1983 | Yasuda | 219/202 |
| 4,497,083 A | * 2/1985 | Nielsen, Jr. et al. | 15/250.06 |
| 4,670,933 A | * 6/1987 | Toplenszky | 15/250.07 |
| 4,805,323 A | 2/1989 | Motohashi | 15/250.36 |
| 4,832,262 A | 5/1989 | Robertson | 15/250.05 |
| 5,325,561 A | * 7/1994 | Kotlar | 15/250.06 |
| 5,357,646 A | 10/1994 | Kim | 15/111 |
| 5,426,814 A | 6/1995 | Minnick | 15/250.04 |
| 5,539,951 A | 7/1996 | Guell et al. | 15/250.04 |
| 5,572,765 A | * 11/1996 | Guell | 15/250.06 |
| 5,632,058 A | * 5/1997 | Stanak | 15/250.04 |
| 5,649,337 A | 7/1997 | Lobner | 15/250.06 |
| 5,787,543 A | 8/1998 | Selders | 15/250.06 |
| 5,791,010 A | 8/1998 | Brady et al. | 15/250.07 |
| 6,058,554 A | 5/2000 | Warren | 15/250.06 |

* cited by examiner

Primary Examiner—Gary K. Graham
(74) Attorney, Agent, or Firm—Donald R. Schoonover

(57) ABSTRACT

A windshield wiper includes a plurality of electrical resistance heater elements. Some of the heater elements are located in the flexible wiper blade body and some of the heater elements are located in a wiper blade back element. The heater elements are spaced apart from each other so heat can be evenly distributed over the entire wiper blade and significant amounts of heat can be generated.

1 Claim, 2 Drawing Sheets

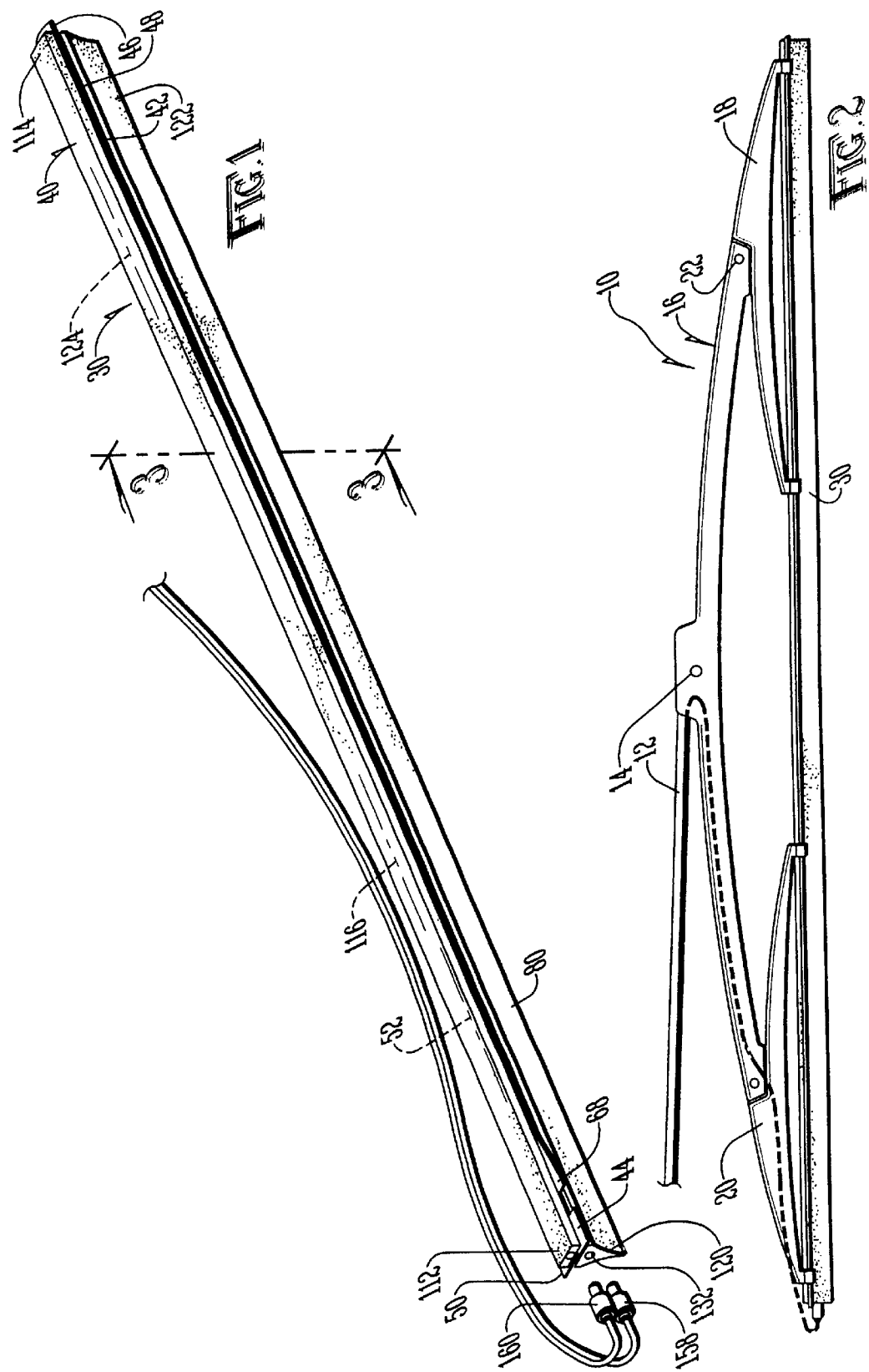

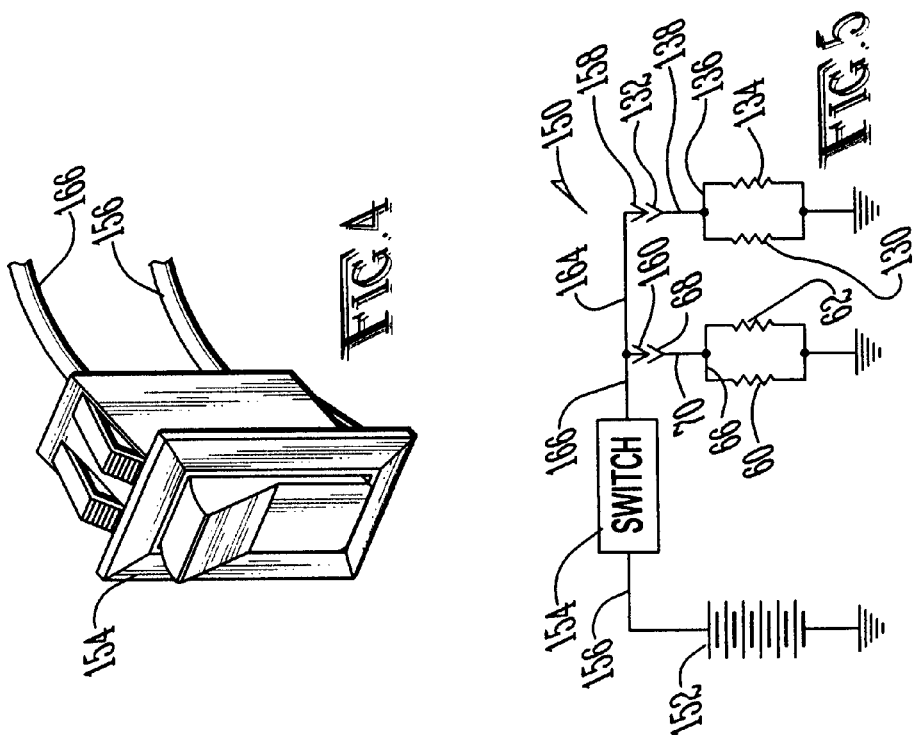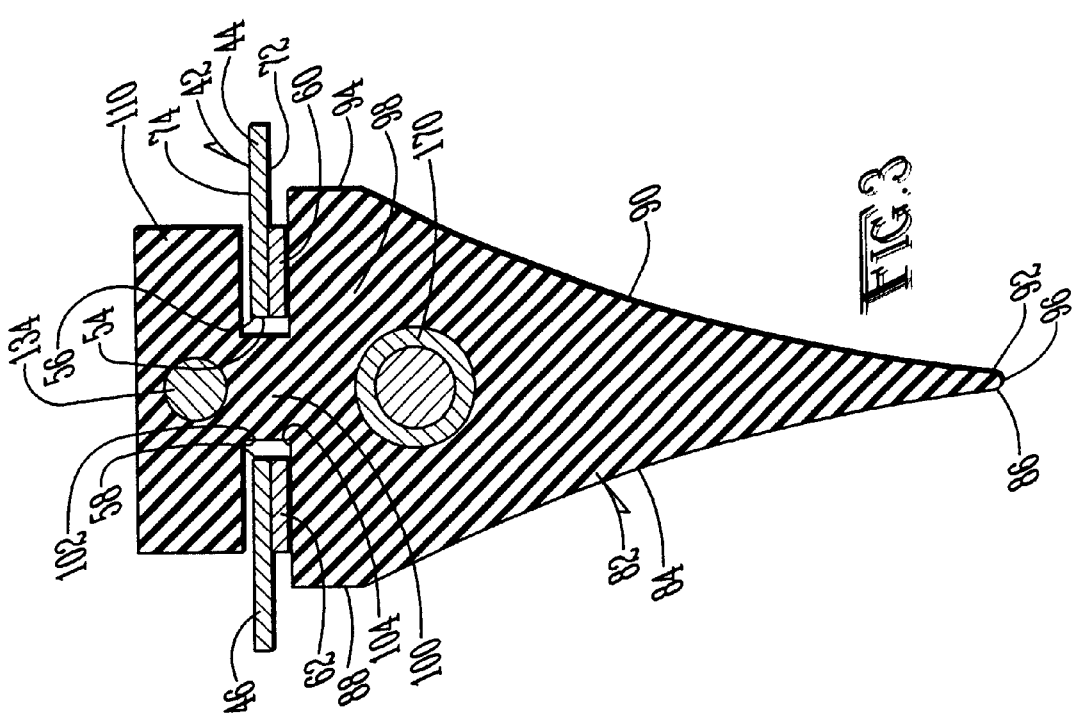

HEATED WINDSHIELD WIPER

BACKGROUND OF THE INVENTION

1. Field of the Invention

The present invention relates to the general art of electric heating, and to the particular field of electrically heated vehicle components.

2. Discussion of the Related Art

Ice-covered windshields are a constant problem in many areas of the country during much of the winter. Many people must add time to a commute in order to clear their windshield. Since clearing the windshield is an important safety concern, it is imperative that such an operation be as thorough as possible. This often requires a person to scrape ice from the windshield. This can be a difficult operation, especially if it is very cold.

Therefore, there is a need for a device for clearing a windshield in an efficient manner.

The art contains many examples of devices intended to clear ice from a windshield. These devices include heating the windshield itself as well as heated windshield wipers. However, all of the known devices have a drawback in that the wiper itself is not adequately heated. Generally, only the flexible portion of the wiper blade that contacts the windshield is heated. This works fairly well; however, even with a heated flexible portion, the wiper may not be totally effective because the amount of heat necessary to either free the wiper or to adequately clear the windshield is not available from the single source of heat.

While it might appear that simply increasing the amount of heat generated by a windshield wiper is a solution to the above-discussed problem, such is not the case since a great deal of heat may damage the flexible wiper blade. Therefore, there is a limit to the amount of heat that can be safely and efficiently generated from known heated windshield wipers.

Therefore, there is a need for a device for clearing a windshield in an efficient manner, yet does not endanger the flexible wiper blade portion of the windshield wiper.

In some conditions, it is cold enough where ice continues to form on the windshield and on the wiper even after the vehicle is warmed up and the windshield has been initially cleared. Under such conditions, the windshield wiper must continually clear the windshield. The wiper must thus generate sufficient heat to prevent ice from building up on the wiper during operation.

Therefore, there is a need for a device for clearing a windshield in an efficient manner and that can generate heat in a manner that prevents ice from building up on the windshield wiper during operation of the windshield wiper.

Since some climate conditions are so severe, it may be necessary to generate heat from a variety of directions and sources for the same windshield wiper. This requirement may result from severe cold or from a driving ice storm in which ice can accumulate on the wiper during driving and thus reduce its effectiveness. Many known heated windshield wipers have only a single source of heat and thus may not be fully effective during all conditions.

Therefore, there is a need for a device for clearing a windshield in an efficient manner that can be effective under nearly any climate condition.

Some known heated windshield wipers are very difficult and expensive to replace due to the circuitry associated with the wiper. In fact, some wipers must be entirely replaced, including the entire wiper blade structure, including the carrier bows, due to this problem. This can be expensive and, in some instances, require the services of a skilled mechanic thereby further increasing the costs. The cost problem has inhibited the commercial acceptance of heated windshield wipers. Since a heated windshield wiper can be such a safety factor, it is important to encourage the use of such equipment.

Therefore, there is a need for a device for clearing a windshield in an efficient manner and which can be easily installed and changed.

Still further, since windshield wipers often must function and operate under severe weather conditions, some known heated windshield wipers may be subject to failure. Ice can become lodged in some electrical connections thereby vitiating, if not totally eliminating, the heating function of the wiper blade.

Therefore, there is a need for a device for clearing a windshield in an efficient manner and that can continue to function and operate even if a portion of the device fails or become impaired.

PRINCIPAL OBJECTS OF THE INVENTION

It is a main object of the present invention to provide a device for clearing a windshield in an efficient manner.

It is another object of the present invention to provide a device for clearing a windshield in an efficient manner, yet does not endanger the flexible wiper blade portion of the windshield wiper.

It is another object of the present invention to provide a device for clearing a windshield in an efficient manner and that can generate heat in a manner that prevents ice from building up on the windshield wiper during operation of the windshield wiper.

It is another object of the present invention to provide a device for clearing a windshield in an efficient manner that can be effective under nearly any climate condition.

It is another object of the present invention to provide a device for clearing a windshield in an efficient manner and which can be easily installed and changed.

It is another object of the present invention to provide a device for clearing a windshield in an efficient manner and that can accommodate ice newly hitting a windshield as a vehicle is being operated as well as ice sticking on the windshield.

It is another object of the present invention to provide a device for clearing a windshield in an efficient manner and that can continue to function and operate even if a portion of the device fails or become impaired.

SUMMARY OF THE INVENTION

These, and other, objects are achieved by a heated windshield wiper blade unit comprising a wiper blade back element having a first electrical resistance heater system embedded therein, a one-piece flexible windshield wiper element having a second electrical resistance heater system embedded therein and spaced from the first electrical resistance heater element, electrical connections on the first and second electrical resistance heater systems, and an electrical circuit electrically connected to the electrical connections and connecting the electrical reistance heater elements together in parallel with each other.

The dual heating elements permit the windshield wiper of the present invention to generate sufficient heat to clear a windshield of ice under nearly any condition. Still further, the dual source of heat permits the windshield wiper of the present invention to keep itself clear of ice during nearly any condition. The windshield wiper of the present invention has simple male and female jacks to connect the wiper heating elements to a control circuit so the wiper is easily installed and changed when necessary. Furthermore, because there is a dual heat source in the windshield wiper of the present invention, the heat source in the flexible wiper portion of the windshield wiper is not required to generate as much heat as would be the case if that heat source were the only source of heat for the windshield wiper. Thus, if a great deal of heat is required, the flexible wiper portion of the windshield wiper will not be subject to a great deal of heat from the inside of that wiper blade portion. Thus, even though a great deal of heat can be generated from the windshield wiper of the present invention, there is little or no danger of damaging the flexible portion of the windshield wiper due to placing too much heat directly on that portion of the wiper.

Still further, since there are a plurality of different heat sources in the windshield wiper of the present invention, the wiper can accommodate ice from a plurality of directions. That is, ice hitting the windshield can be accommodated by the windshield wiper of the present invention while the windshield wiper can also accommodate ice generated on the windshield.

BRIEF DESCRIPTION OF THE DRAWINGS

FIG. 1 is a perspective view a heated windshield wiper blade unit embodying the teaching of the present invention.

FIG. 2 is a side elevational view of the heated windshield wiper blade unit of the present invention.

FIG. 3 is an enlarged cross-sectional view taken along line 3—3 of FIG. 1.

FIG. 4 is a perspective view of a switch used in an electrical circuit associated with the heated windshield wiper of the present invention.

FIG. 5 is a schematic, illustrating an electrical circuit associated with the heated windshield wiper of the present invention.

DETAILED DESCRIPTION OF THE INVENTION

Other objects, features and advantages of the invention will become apparent from a consideration of the following detailed description and the accompanying drawings.

Shown in FIG. 2 is a windshield wiper system 10 which can be used on most land vehicles, such as automobiles, trucks and the like. Windshield wiper system 10 includes a wiper arm 12 which is mounted at one end thereof on the vehicle and has a main pivot mount 14 on the other end thereof which is pivotally connected to a main wiper blade support structure 16 and which pivotally connects wiper arm 12 to main wiper blade support structure 16. Two carrier bows 18 and 20 are pivotally attached to main wiper blade support structure 16 and each includes a pivot mount, such as pivot mount 22. Wiper arm 12 and the structure so far described functions and operates in a manner usual to windshield wiper blade systems and thus will not be further discussed.

Attached to wiper blade arm 12 is a heated windshield wiper blade unit 30 embodying the present invention. Wiper blade unit 30 not only heats a windshield being cleaned, but maintains a heated environment so ice and snow can be melted off the wiper blade unit 30 itself thereby increasing the efficiency of the overall windshield cleaning operation.

As shown in FIGS. 1–3, heated windshield wiper blade unit 30 comprises a wiper blade back element 40 having a body 42, which can be constructed of metal or like heat conducting material, a first end 44 and a second end 46 on body 42, a first side 48 and a second side 50 on body 42 and a longitudinal axis 52 extending between first and second ends 44 and 46 of body 42. A slot 54 is defined through body 42 and extends along longitudinal axis 52 of body 42 from adjacent to first end 44 to adjacent to second end 46 of body 42. Slot 54 has a first side edge 56 located adjacent to first side 48 of the body 42 and a second side edge 58 located adjacent to second side 50 of body 42.

A first electrical resistance heater element 60 is embedded in body 42 and extends in the direction of longitudinal axis 52 of the body from first end 44 of body 42 to second end 46 of body 42 and is located adjacent to slot 54 and between first side edge 56 of the slot 54 and first side 48 of body 42. A second electrical resistance heater element 62 is embedded in body 42 and extends in the direction of longitudinal axis 54 of body 42 from first end 44 of the body 42 to second end 46 of body 42 and is located adjacent to slot 54 between second side edge 58 of slot 54 and second side 50 of body 42. The electrical resistance heaters 60 and 62 are of the type known in the art and thus will not be further discussed.

As indicated in FIG. 5, an electrical connection 66 between the first electrical resistance heater element 60 and the second electrical resistance heater element 62 electrically connects those two electrical resistance heater elements 60 and 62 in parallel with each other. As shown in FIG. 1, a female electrical connector element 68 is located in first end 44 of body 42, and as shown in FIG. 5, an electrical connection 70 between female electrical connector element 68 and electrical connection 66 between first electrical resistance element 60 and second electrical resistance element 62 electrically connects those elements 60 and 62 together. Body 42 of wiper blade back element 40 further includes an inside surface 72 and an outside surface 74.

Windshield wiper blade unit 30 further includes a windshield wiper member 80 which includes a one-piece flexible body 82 which can be formed of rubber or plastics-type material as will be understood by those skilled in the art based on the teaching of the present disclosure. Body 82 has first side 84 having a distal end 86 and a proximal end 88 located near body 42, a second side 90 having a distal end 92 and a proximal end 94 located near body 42. An apex 96 connects distal end 86 of first side 84 to distal end 96 of second side 90 of flexible body 82. A base 98 connects proximal end 88 of first side 84 to proximal end 94 of second side 90 of flexible body 82. Body 82 further includes a neck element 100 having a proximal end 102 on base 98 of flexible body 82 and a distal end 104 spaced from base 98. Neck element 100 extends through slot 54 defined through body 42 of wiper blade back element 40 with proximal end 102 of neck element 100 being located adjacent to inside surface 72 of back element 40 and distal end 104 of neck element 100 being located adjacent to outside surface 74 of wiper blade back element 40.

Body 82 further includes an abutment element 110 on distal end 104 of neck element 100 of windshield wiper member 82 and which is located adjacent to outside surface 74 of body 42 of wiper blade back element 40 and includes a first end 112, a second end 114, and a longitudinal axis 116 extending between first end 112 of abutment element 110 and second end 114 of abutment element 110 in the direction of longitudinal axis 52 of windshield wiper blade unit 30. Flexible body 82 further includes a first end 120 located adjacent to first end 44 of wiper blade back element 40 and a second end 122 located adjacent to second end 46 of wiper blade back element 40. Abutment element 110 further has a longitudinal axis 124 which extends between first end 120 of flexible body 82 and second end 122 of flexible body 82.

Windshield wiper blade 30 further includes a third electrical resistance heater element 130 embedded in windshield wiper body 82 and which extends in the direction of longitudinal axis 124 of flexible windshield wiper body 82 from first end 120 of the windshield wiper body to second end 124 of the windshield wiper body. A female jack element 132 is positioned in first end 120 of the windshield wiper body. Windshield wiper blade 30 further includes a fourth electrical resistance heater element 134 embedded in abutment element 110 of windshield wiper body 82 and extends in the direction of the longitudinal axis of the abutment element from first end 112 of the abutment element to second end 114 of abutment element 110 of windshield wiper body 82.

As shown in FIG. 5, an electrical connection 136 between the third electrical resistance heater element 130 and the fourth electrical resistance heater element 134 electrically connects those electrical resistance heaters 130 and 134 in parallel with each other. An electrical connection 138 between female jack element 132 and electrical connection 136 between third electrical resistance heater element 130 and fourth electrical resistance heater element 134 electrically connects those heater elements 130 and 134 in parallel with first electrical resistance heater element 60 and second electrical resistance heater element 62.

As can be understood from the foregoing, the four electrical resistance heaters of windshield wiper blade unit 30 place heat in the necessary locations on the unit 30 and can continue to operate even if one or more of the heaters fail. Since the heat sources are spaced from each other, no individual section of the unit is subject to an unduly high heat source and yet the overall unit is capable of generating a significant amount of heat.

Body 42 of wiper blade back element 40 is interposed between abutment element 110 of windshield wiper body 82 and base 98 of windshield wiper body 82 to be securely held there so the windshield wiper body is securely held on the back element.

As shown in FIG. 5, device 30 further includes an electrical circuit 150 which includes a power source 152, an electrical switch 154, an electrical connector 156 electrically connecting the switch 154 to the power source 152, a first male electrical connector element 158 which connects the switch 154 to female jack connector 132, a second male electrical connector element 160 which connects switch 154 to female jack connector 68, a first electrical connector 164 electrically connecting the switch 154 to first male jack 158 and a second electrical connector 166 electrically connecting switch 154 to second male jack 160.

Switch 154 can be located inside the vehicle on the dashboard or the like, and power source 152 can be the vehicle battery if desired.

It is understood that while certain forms of the present invention have been illustrated and described herein, it is not to be limited to the specific forms or arrangements of parts described and shown.

I claim:

1. A heated windshield wiper blade unit comprising:
   a) a wiper blade back element having
      (1) a body,
      (2) first and second ends on the body,
      (3) first and second sides on the body,
      (4) a longitudinal axis extending between the first and second ends on the body,
      (5) a slot defined through the body and extending along the longitudinal axis of the body from adjacent to the first end of the body to adjacent to the second end of the body, the slot having a first side edge located adjacent to the first side of the body and a second side edge located adjacent to the second side of the body,
      (6) a first electrical resistance heater element embedded in the body and extending in the direction of the longitudinal axis of the body from the first end of the body to the second end of the body and being located adjacent to the slot and between the first side edge of the slot and the first side of the body,
      (7) a second electrical resistance heater element embedded in the body and extending in the direction of the longitudinal axis of the body from the first end of the body to the second end of the body and being located adjacent to the slot and between the second side edge of the slot and the second side of the body,
      (8) an electrical connection between the first electrical resistance heater element and the second electrical resistance heater element,
      (9) a female electrical connector element in the first end of the body,
      (10) an electrical connection between the female electrical connector element and the electrical connection between the first electrical resistance element and the second electrical resistance element,
      (11) an inside surface, and
      (12) an outside surface;
   b) a windshield wiper member which includes
      (1) a one-piece flexible body having
         (A) first side having a distal end and a proximal end,
         (B) a second side having a distal end and a proximal end,
         (C) an apex connecting the distal end of the first side to the distal end of the second side of the flexible body of said windshield wiper member,
         (D) a base connecting the proximal end of the first side to the proximal end of the second side of the flexible body of said windshield wiper member,
         (E) a neck element having a proximal end on the base of the flexible body and a distal end spaced from the base of the flexible body,
         (F) the neck element extending through the slot defined through the body of said wiper blade back element with the proximal end of the neck element being located adjacent to the inside surface of the back element and the distal end of the neck element being located adjacent to the outside surface of the wiper blade back element,
         (G) an abutment element on the distal end of the neck element of said windshield wiper member and located adjacent to the outside surface of the body of said wiper blade back element and including
            (i) a first end,
            (ii) a second end,
            (iii) a longitudinal axis extending between the first end of the abutment element and the second end of the abutment element,
         (H) a first end of the flexible body,
         (I) a second end of the flexible body, and
         (J) a longitudinal axis extending between the first end of the flexible body and the second end of the flexible body,
      (2) a third electrical resistance heater element embedded in the flexible body and extending in the direction of the longitudinal axis of the flexible body from the first end of the flexible body to the second end of the flexible body, (3) a female jack element in the first end of the flexible body, (4) a fourth electrical resistance heater element embedded in the abutment element of the flexible body and extending in the direction of the longitudinal axis of the abutment element of the flexible body from the first end of the abutment element of the flexible body to the second end of the abutment element of the flexible body, (5) an electrical connection between the third electrical resistance heater element and the fourth electrical resistance heater element, (6) an electrical connection between the female jack element and the electrical connection between the third electrical resistance heater element and the fourth electrical resistance heater element, (7) the body of said wiper blade back element being interposed between the abutment element of the flexible body and the base of the flexible body, and (8) all of the electrical resistance heater elements being spaced apart from each other and electrically connected in parallel with each other; and c) an electrical circuit which includes (1) a power source, (2) an electrical switch, (3) an electrical connector electrically connecting the switch to the power source, (4) a first male electrical connector element, (5) a second male electrical connector element, (6) a first electrical connector electrically connecting the switch to the first male electrical connector element, and (7) a second electrical connector electrically connecting the switch to the second male electrical connector element.

* * * * *